(12) United States Patent
Lin et al.

(10) Patent No.: US 6,578,097 B1
(45) Date of Patent: Jun. 10, 2003

(54) METHOD AND APPARATUS FOR TRANSMITTING REGISTERED DATA ONTO A PCI BUS

(75) Inventors: Chang-Fu Lin, Hsin Chu (TW); Chih-Jou Lin, Taichung (TW)

(73) Assignee: Silicon Integrated Systems Corp. (TW)

( * ) Notice: Subject to any disclaimer, the term of this patent is extended or adjusted under 35 U.S.C. 154(b) by 461 days.

(21) Appl. No.: 09/651,423

(22) Filed: Aug. 30, 2000

(51) Int. Cl.[7] .................................................. G06F 1/00
(52) U.S. Cl. ......................... 710/107; 710/110; 710/310
(58) Field of Search ................................. 710/107, 110, 710/112, 305, 306–309, 310–312, 316, 36, 38, 52, 60, 61, 314, 118, 125

(56) References Cited

U.S. PATENT DOCUMENTS

| | | | | |
|---|---|---|---|---|
| 6,092,141 A | * | 7/2000 | Lange | 710/308 |
| 6,230,219 B1 | * | 5/2001 | Fields, Jr. et al. | 710/22 |
| 6,405,276 B1 | * | 6/2002 | Chen et al. | 710/310 |
| 6,425,041 B1 | * | 7/2002 | Klein | 710/306 |
| 6,507,899 B1 | * | 1/2003 | Oberlaender et al. | 711/169 |

* cited by examiner

Primary Examiner—Paul R. Myers
Assistant Examiner—Raymond N Phan
(74) Attorney, Agent, or Firm—Martine & Penilla, LLP

(57) ABSTRACT

A method and apparatus for transmitting registered data onto a PCI bus is provided, which can reduce the delay time of manipulating the outgoing signals without greatly increasing the circuit complexity. The apparatus employee a 2R1W data buffer to send a current phase data and a next phase data one clock cycle ahead of the actual AD activity on PCI bus and use a multiplexer to select the current phase data or the next phase data according to a select signal. The select signal is outputted by a OR gate with IRDY# and TRDY# signals as its inputs. Then, the apparatus use a flip-flop to toggling the output signal of the multiplexer to the PCI bus at the actual AD activity. Therefore, the apparatus of the present invention not only reduce the delay time of manipulating the outgoing signals, but also is implemented with simple architecture.

7 Claims, 4 Drawing Sheets

METHOD AND APPARATUS FOR TRANSMITTING REGISTERED DATA ONTO A PCI BUS

BACKGROUND OF THE INVENTION

1. Field of the Invention

The present invention relates to a method and apparatus for data transmission, and more particularly relates to a method and apparatus for transmitting registered data onto a PCI bus, which can reduce the delay time of manipulating the outgoing signals without greatly increasing the circuit complexity.

2. Description of the Related Art

Computer systems commonly employ one or more peripheral buses that enable communications among a variety of devices. The communications between these devices, which are so-called "agents", generally are performed according to protocols. One of the protocols is the Peripheral Component Interconnect (PCI) published bus specification, which allows data communication bandwidth up to 266 megabytes per second when the clock frequency is 66 MHz.

Typically, there are many agents coupled to the PCI bus. A data transfer on a PCI bus is performed when one requesting agent issues a bus transaction to another receiving agent. The requesting agent is referred to as the "master" agent, and the receiving agent is referred to as the "target" agent. The master agent drives address/command to a target agent and, if the command is "write", further drives a set of data following the address/command. Then, the target agent decodes the address and accepts the data if the command is "write", or returns some data if the command is "read". A bus transaction thus consists of an address phase followed by one or more data phases.

FIG. 1 is a functional block-diagram illustrating the output control logic of a conventional master agent coupled to a PCI bus 100. Note that the PCI bus 100 defined in the specification has more than 47 pins, but in this figure, only the AD bus AD[31:0] 101 are specified for clarity. The internal control signals, current phase data pointer 105, current phase address pointer 106 and address phase selector 107 are internal state signals of the agent. The current phase data pointer 105 and current phase address pointer 106 are two pointers controlled by the ongoing transaction to switch the data and address signals stored in the buffers 113 and 112, respectively. The address phase selector 107 is used to select the address phase or the data phase. A multiplexer 111 and an I/O buffer 110 are used to transmit signals onto the PCI bus 100. Note that the actual implementation of the data buffer and the address buffer can be any form.

PCI data transfers are controlled by three signals, including FRAME#, IRDY# and TRDY#. The signal FRAME# is driven by the master to indicate the beginning and the end of a transaction. The signal IRDY# is driven by the master to indicate that the master is ready to transfer data. And the signal TRDY# is driven by the target to indicate that the target is ready to transfer data. The interface is in the Idle state if both the FRAME# and IRDY# signals are de-asserted. When the FRAME# signal is asserted, it is referred to as the address phase, and the address/bus command code are transferred on the first clock edge data is then transferred during the following data phase while both the IRDY# and TRDY# are asserted. As the master finishes transferring the final data, the FRAME# signal is then de-asserted. After the target agent completes transferring the final data, the IRDT# signal is also de-asserted and the interface returns to the Idle state.

FIG. 2 is a timing diagram of the operation of the conventional master agent illustrated in FIG. 1. The upper half of this diagram shows the waveforms of the internal signals of the master agent, and the lower half shows the waveforms of outgoing signals driven onto the PCI bus 100 by the master agent. In the third clock cycle, the address phase selector 107 chooses the address Aj from address buffer 112, and drives the address signal onto PCI bus 100 after some delay D2 produced by the multiplexer 111 and the I/O buffer 110. In the next clock cycle, the address phase selector 107 is de-asserted and the multiplexer 111 selects the data Di, which comes from the data buffer 113 and is pointed by current phase data pointer 105 (with index i). Since no data transfer occurs in this clock cycle, Di is kept on driving onto PCI bus 100 in the sixth clock cycle. After the sixth clock cycle, while both TRDY# and IRDY# are asserted, the index i of the current phase data pointer 105 will shift to i+1. Besides the output delay produced by the multiplexer 111 and the I/O buffer 110, data phase switching from Di to Di+1 also results in some delay.

Thus, the master agent as shown in FIG. 1 will induce lots of delays, such as D1 and D2, before driving AD signals onto the PCI bus. This delay will reduce the time budget of the target agent that receives the signals on the same PCI bus. When the clock cycle becomes shorter and shorter, it would be difficult for the target agent to manipulate the signals well. For example, when the clock frequency is up to 66 MHz and a cycle time is reduced to 15 ns, it is frustrated to handle the signals in such a short or even a shorter time period.

In order to solve the delay issue described above, another circuit with two-level pipelined stages is illustrated in FIG. 3. FIG. 3 shows a functional block diagram illustrating the output control logic of a conventional pipelined agent. In this circuit structure, output signals are registered before transmitting onto the PCI bus 300, and data prepared by the 1R1W (one read ports and one write port) data buffer 310 is done one clock before the signal is transmitted, which relates to a next data 321 preparation in the agent. Obviously, this circuit must employee another pipelined stage (register) for storing the initial data phase before the first data transfer occurs on the PCI bus 300. As shown in FIG. 3, the circuit employees two multiplexers 311 and 312, and flip-flop 313 and 314 to sustain the initial data until a successful data transfer occurs. However, this circuit illustrated in FIG. 3 is much complex.

It would be desirable to provide a simple method and apparatus in which the agent can output signals with a higher speed without greatly increasing the circuit complexity, thus can conform with the timing requirements defined in the PCI specification.

SUMMARY OF THE INVENTION

An object of the present invention is to provide a method and apparatus for transmitting registered data onto a PCI bus, which can reduce the delay time of manipulating the outgoing signals without greatly increasing the circuit complexity.

An apparatus according to the present invention comprises a data buffer for storing a plurality of registered data and outputting a current data signal and a next data signal according to a current phase data pointer and a next phase data pointer, respectively. The apparatus further comprises an address buffer for storing address signals and outputting current address signal according to a current phase address pointer. Besides, the apparatus also comprises a first multiplexer coupled to the data buffer and the address buffer for selecting the current data signal or the current address signal according to an address phase Select signal. A OR logic gate is employed for receiving an IRDY# signal and a TRDY# signal from the PCI Bus and outputting a data Transfer Select signal. A second multiplexer couples to the data buffer and the first multiplexer for selecting the output of the first multiplexer or the next data signal according to the data Transfer Select signal. A flip-flop couples to the second multiplexer for toggling the output signal of the second multiplexer to the PCI Bus according to a reference clock.

The apparatus further comprises a first I/O buffer coupled to the flip-flop for transferring the output signal of the flip-flop to the PCI Bus, a second I/O buffer coupled to the logic gate for transferring the IRDY# signal from the PCI Bus to the logic gate, and a third I/O buffer coupled to the logic gate for transferring the TRDY # signal from the PCI Bus to the logic gate.

The method according to the present invention comprises the steps of:

a) output a current data signal and a next data signal by a data buffer to a first multiplexer and a second multiplexer, respectively;

b) output an address signal by an address buffer to the first multiplexer;

c) select the current data signal or the address signal by the first multiplexer according to an address phase Select signal;

d) select the next data signal or the output signal of the first multiplexer by the second multiplexer according to a data Transfer Select signal, which is the output signal of a logic gate with IRDY# and TRDY# signals as inputs; and e) send the output signal of the second multiplexer to the PCI bus by a flip-flop.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A method and apparatus for transmitting registered data onto a PCI bus, which can reduce the delay time of manipulating the outgoing signals without greatly increasing the circuit complexity will be described in the following.

Figure 4:
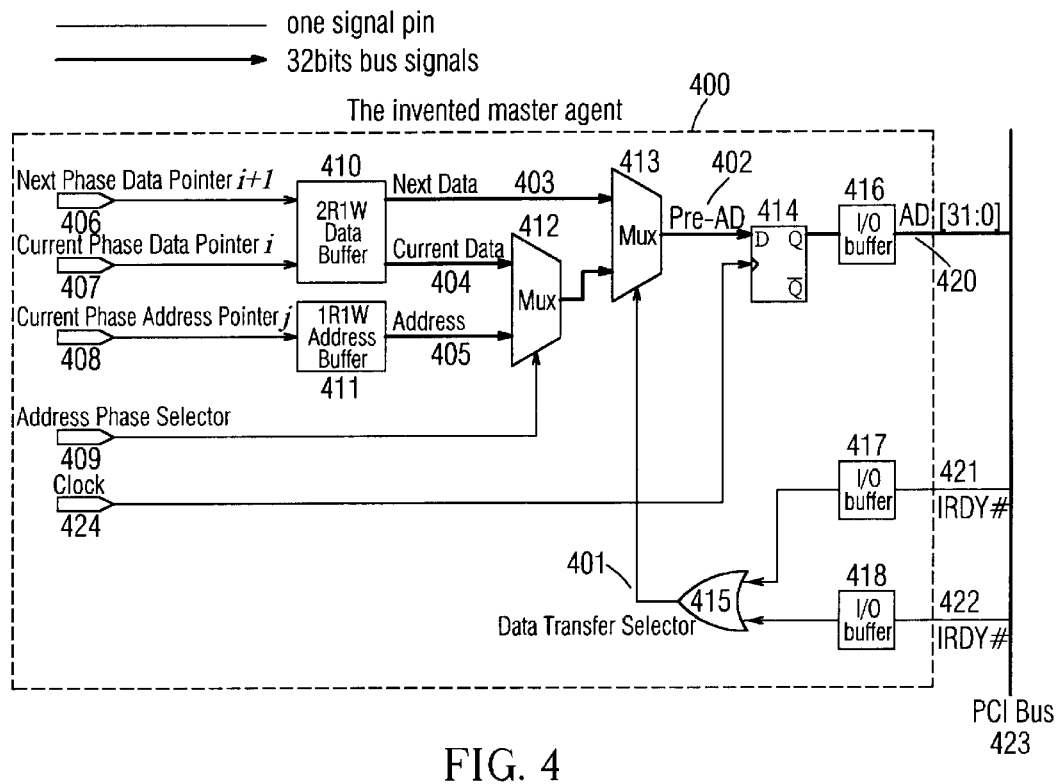
FIG. 4 is a functional block diagram illustrating the output control logic of the present invention when applied to a master agent.

FIG. 4 is a functional block diagram illustrating the output control logic of the present invention when applied to a master agent. In this embodiment, the master agent 400 comprises a 2R1W data buffer 410 for storing a plurality of data, and a 1R1W address buffer 411 for storing a plurality of address. The 2R1W data buffer 410 outputs a current data 404 and a next data 403 according to a current phase data pointer 407 and a next phase data pointer 406, respectively, while the 1R1W address buffer 411 outputs the current address 405 according to a current phase address pointer 408. The master agent 400 further comprises a first multiplexer 412 and a second multiplexer 413 to select the current data 404, the next data 403 or the current address 405. The first multiplexer 412 is coupled to the 2R1W data buffer 410 and the 1R1W address buffer 411, to select the current data 404 or the current address 405 according to an address phase selector 409. Meanwhile, the second multiplexer 413 is coupled to the 2R1W data buffer 410 and the first multiplexer 412 to select the next data 403 or the output signal of the first multiplexer 412 according to a data Transfer selector 401, which is asserted by an OR gate 415. The OR gate 415 receives the IRDY# signal 421 and TRDY# signal 422 and makes the OR operation. A flip-flop 414 is employed by the master agent 400 to output the Pre-AD signal, which is output by the second multiplexer 413, to the PCI bus 423. The flip-flop 414 is triggered by the rising edge of the clock 424.

Figure 1:
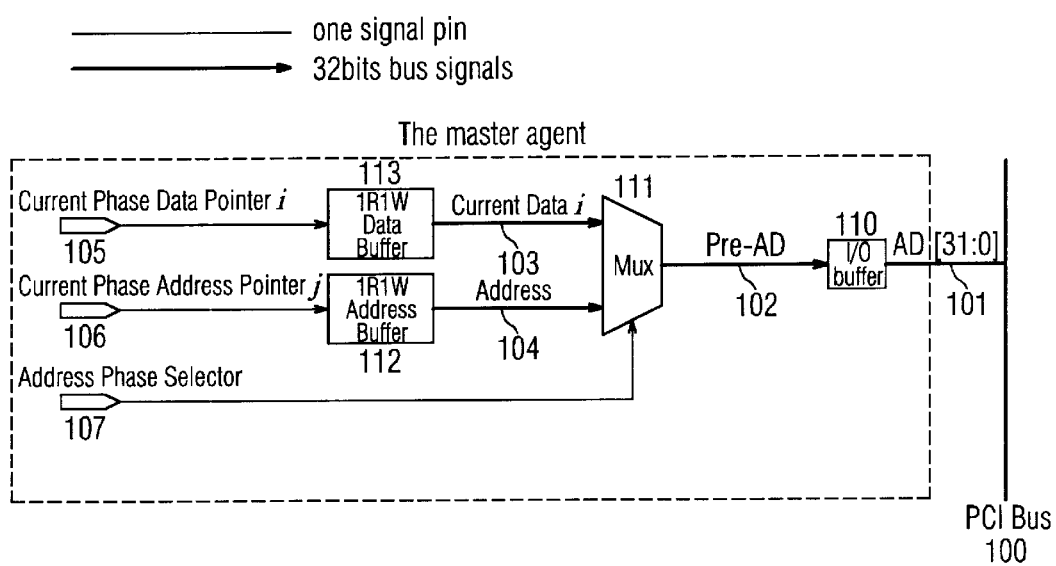
FIG. 1 is a functional block diagram illustrating the output control logic of a conventional master agent.

A major difference compared with the conventional master agent (as shown in FIG. 1) is that the 2R1W data buffer 410 is employed by the master agent according to the present invention. This data buffer 410 will output the current data 404 pointed by the current phase data pointer 407 and the next data 403 pointed by the next phase data pointer 406.

The multiplexer 412 acts as the similar role with the multiplexer 111 shown in FIG. 1, except that it is one clock cycle ahead of the actual AD activity on PCI bus 423 in order to knock flip-flop 414 for cleaning registered output signals multiplexer 413 is used to select next data 403 after a successful data transfer occurs on the PCI bus 423; otherwise, it will select the output of the multiplexer 412 and keep the same data which would be driven onto the PCI bus 423. Moreover, the switching control of multiplexer 413 is data Transfer selector 401, i.e. the output of the OR gate logic 415 with IRDY# 421 and TRDY# 422 as its inputs. While there is a successful data transfer, data buffer 410 will shift to output the next data. Otherwise, multiplexer 413 will choose current data 404 pointed by current phase address pointer 408 and output it as Pre_AD 402. Flip-flop 414 and I/O buffer 416 are used to register output signals in the present invention. Because the output node of flip-flop 414 only connects to the I/O buffer 416, thus one of the advantages of the present invention is that the AD signals transmitted from the flip-flop 414 could directly pass through I/O buffer 416 and be sent onto PCI bus 423.

Figure 2:
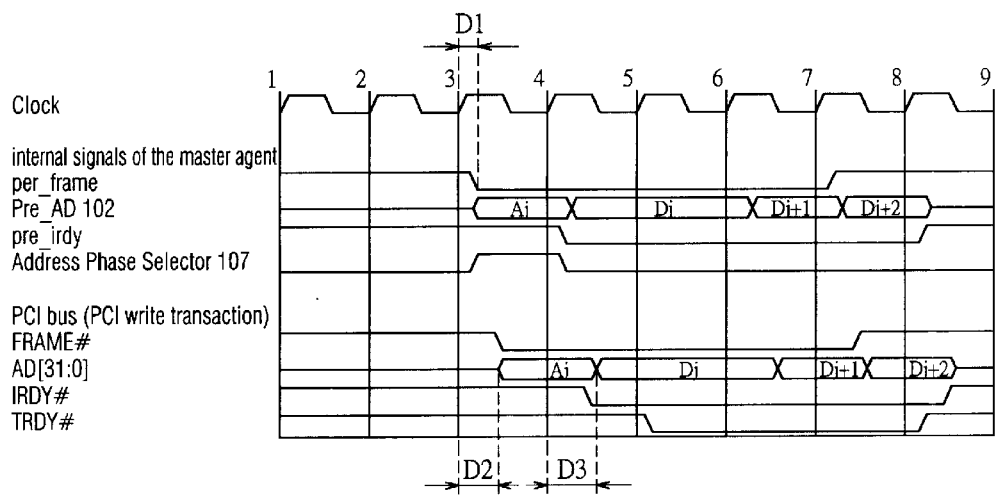
FIG. 2 is a timing diagram of the practicing operation of the conventional master agent described in FIG. 1.
Figure 5:
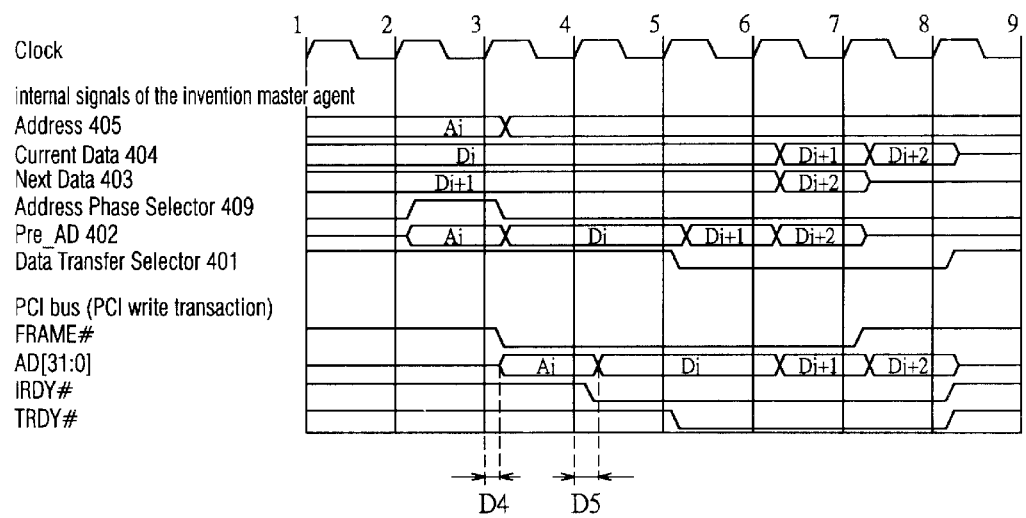
FIG. 5 is a timing diagram illustrating the practicing operation of the circuit described in FIG. 4.

FIG. 5 is a timing diagram illustrating the practicing operation of the circuit described in FIG. 4. The waveform further relates to a PCI Write transaction of the preferred embodiment of the present invention discussed above. As similar as the arrangement in FIG. 2, the upper half of this diagram shows the waveforms of the internal signals of the master agent, and the lower half shows the waveforms of outgoing signals driven onto PCI bus 423 by the master agent. Note that the internal signals of the invention is one clock cycle ahead the actual AD activity on PCI bus 423. Therefore, in the second clock cycle, the address phase selector 409 chooses the address Aj from the address buffer 411 pointed by the current phase address pointer 408, and the address Aj is transmitted to the flip-flop 414. Then the master agent drives the address signal onto PCI bus 423 in the next clock cycle. In the third clock cycle, the address phase selector 409 is de-asserted and the multiplexer 412 outputs the data Di which comes from data buffer 410 and is pointed by the current phase data pointer 407 (with index i). Then, data Di will be transmitted onto PCI bus 423 in the forth clock cycle by the flip-flop 414. Since the target agent does not assert TRDY# 422 before fifth clock cycle, the data Transfer selector 401 will not be asserted to switch multiplexer 413. Therefore, the multiplexer 413 still outputs the signals come form multiplexer 412 before fifth clock cycle.

While there is an actual data transfer in the sixth clock cycle, both IRDY# 421 and TRDY# 422 are asserted, the multiplexer 413 will switch to Di+1 and the index i of current phase data pointer 407 will also shift to i+1. After the sixth clock cycle, both current data 404 and next data 403 will change to the next state, respectively. This procedure will be repeated until the final data is ready to be transferred. In the final two clock cycles, it is the same scenario as that of the sixth clock cycle, except that the final data will not exist on next data 403 in the final clock cycle.

Figure 6:
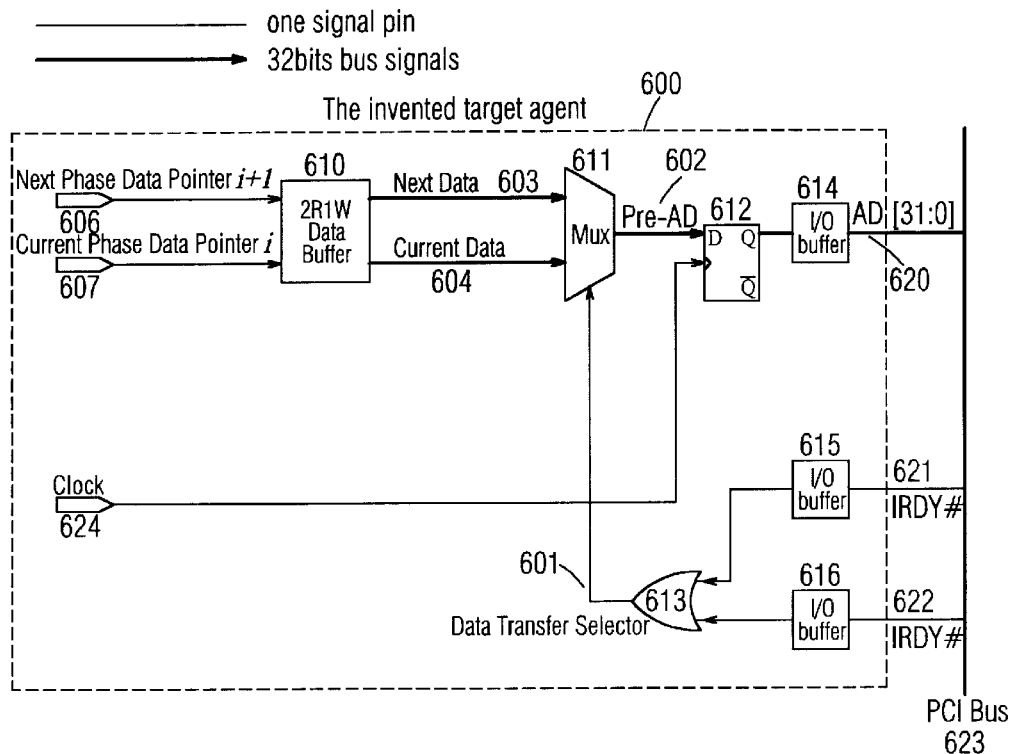
FIG. 6 is another functional block diagram illustrating the output control logic of the present invention when applied to a target agent.

Another preferred embodiment of the present invention will be discussed below. FIG. 6 is another functional block diagram illustrating the output control logic of the present invention when applied to a target agent. It is obvious that the whole structure is similar to the master agent shown in FIG. 4 except for the address control circuit is removed. Hence, the data transfer mechanism of the circuit shown in FIG. 6 is similar to that of the circuit shown in FIG. 4. Note that the target agent will respond data back to the PCI bus while the master agent issues a Read command. Thus, the transmitting agent can be a master or a target. The present invention can be further applied to the agents using the same bus protocol.

Figure 7:
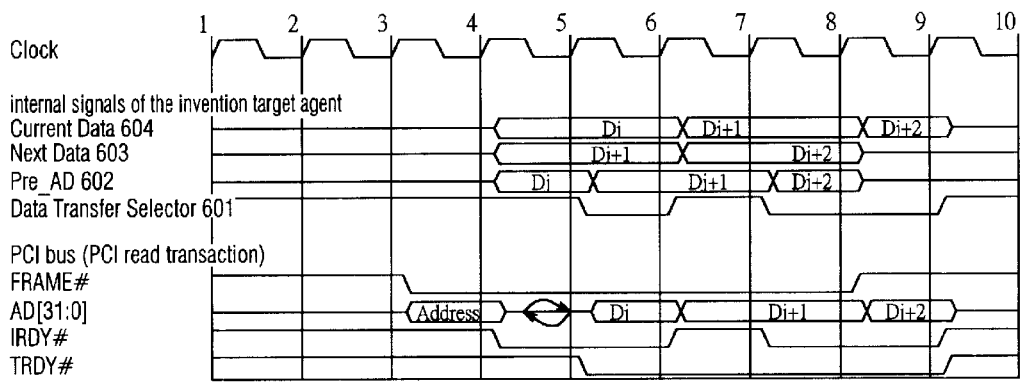
FIG. 7 is the timing diagram illustrating the practicing operation of the circuit described in FIG. 6.

FIG. 7 is the timing diagram illustrating the practicing operation of the circuit described in FIG. 6. The waveform further relates to the condition that a master agent issues a Read command toward the target agent. In the fourth clock cycle, when the master agent drives an address or a command onto PCI bus 623, the target agent will decode the address and command. Then the target agent recognizes the command is "read", thus will prepare the data Di after the fourth clock cycle. In the fifth clock cycle, the target agent outputs the registered data Di onto PCI bus 623 and sets TRDY# 622 asserted after the fifth clock cycle. At the same time, the successful data transfer forces current data 604 and next data 603 shifting to the next state, respectively. In the seventh clock cycle, however, the master agent does not set IRDY# 621 asserted, thus the multiplexer 611 will drive Di+1 to Pre_AD 602. In the eighth clock cycle, another successful data transfer forces current data 604 and next data 603 shifting again, and the data Di+2 is driven to Pre_AD 602. In the ninth clock cycle, the final registered data is driven onto PCI bus 623.

Figure 3:
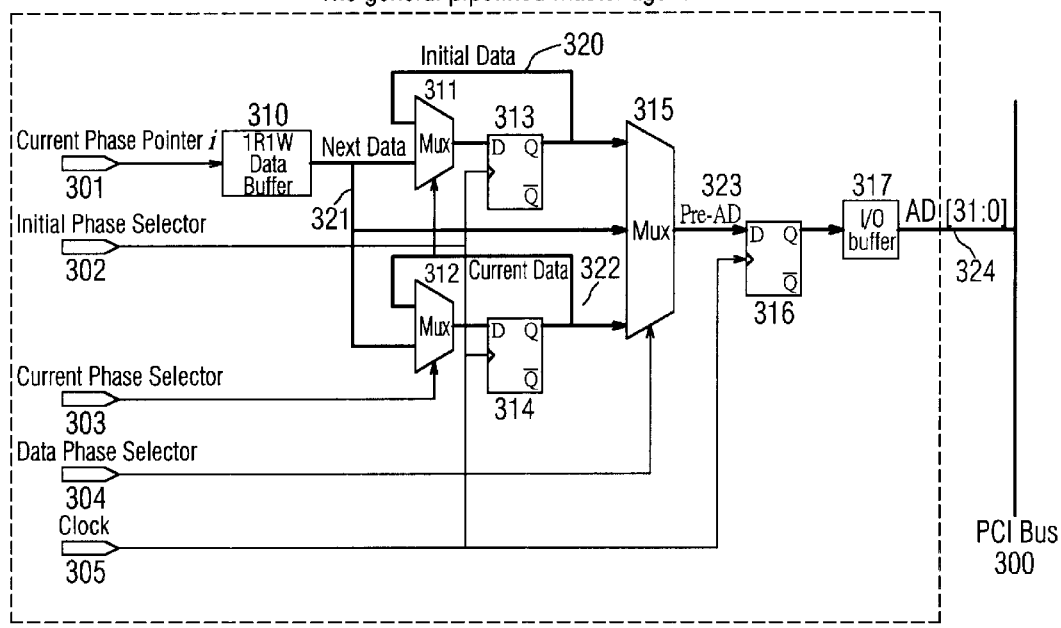
FIG. 3 is a functional block diagram illustrating the output control logic of a conventional pipelined agent.

Referring to FIG. 5 and FIG. 7, we can see that in these preferred embodiments of the present invention, transmission delay compared with that of the conventional agent shown in FIG. 1 can be reduced by adopting the data buffer described above. Besides, it will not greatly increase the complexity of the circuitry as the case shown in FIG. 3. Thus, a method and apparatus for transmitting registered data onto a PCI bus, which can reduce the delay time of manipulating the outgoing signals without greatly increasing the circuit complexity can be done.

While there has been described what are at present considered to be preferred embodiments of the invention, it will be understood that various modifications may be made thereto, and it is intended that the appended claims cover all such modifications as fall within the spirit and scope of the present invention.

What is claimed is:

1. An apparatus for transmitting registered data onto a PCI bus, comprising:
    a data buffer for storing a plurality of registered data and outputting a current data signal and a next data signal according to a current phase data pointer and a next phase data pointer, respectively;
    an address buffer for storing address signals and outputting current address signal according to a current phase address pointer;
    a first multiplexer coupled to said data buffer and said address buffer for selecting said current data signal or said current address signal according to an address phase Select signal;
    a logic gate for receiving an IRDY# signal and a TRDY# signal from said PCI Bus and outputting a data Transfer Select signal;
    a second multiplexer coupled to said data buffer and said first multiplexer for selecting the output of said first multiplexer or said next data signal according to said data Transfer Select signal; and,
    a flip-flop coupled to said second multiplexer for toggling the output signal of said second multiplexer to said PCI Bus according to a reference clock.

2. The apparatus according to claim 1, further comprising:
    a first I/O buffer coupled to said flip-flop for transferring the output signal of said flip-flop to said PCI Bus;
    a second I/O buffer coupled to said logic gate for transferring said IRDY# signal from said PCI Bus to said logic gate; and
    a third I/O buffer coupled to said logic gate for transferring said TRDY # signal from said PCI Bus to said logic gate.

3. The apparatus according to claim 1, wherein said logic gate is an OR gate.

4. The apparatus according to claim 2, wherein said logic gate is an OR gate.

5. The apparatus according to claim 1, wherein said data buffer is a buffer with two read ports and one write port.

6. A method for transmitting registered data onto a PCI bus comprising the steps of:
    outputting a current data signal and a next data signal by a data buffer to a first multiplexer and a second multiplexer, respectively;
    outputting an address signal by an address buffer to said first multiplexer;
    selecting said current data signal or said address signal by said first multiplexer according to an address phase Select signal;
    selecting said next data signal or the output signal of said first multiplexer by said second multiplexer according to a data Transfer Select signal, which is the output signal of a logic gate with IRDY# and TRDY# signals as inputs; and
    sending the output signal of said second multiplexer to said PCI bus by a flip-flop.

7. The method according to claim 6, wherein said logic gate performs OR operation.

* * * * *